(12) United States Patent
Ertle et al.

(10) Patent No.: US 7,735,508 B2
(45) Date of Patent: Jun. 15, 2010

(54) ROTARY SLIDE VALVE

(75) Inventors: Peter Ertle, Durlangen (DE);
Karl-Heinz Urban, Spraitbach (DE);
Joachim Ilg, Aalen (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 552 days.

(21) Appl. No.: 11/801,083

(22) Filed: May 8, 2007

(65) Prior Publication Data

US 2007/0284007 A1 Dec. 13, 2007

(30) Foreign Application Priority Data

May 27, 2006 (DE) .................. 10 2006 024 769

(51) Int. Cl.
*F16K 11/00* (2006.01)
*B62D 5/083* (2006.01)
(52) U.S. Cl. .................. 137/15.21; 137/315.09; 137/625.21; 91/375 A; 180/427; 180/441
(58) Field of Classification Search .............. 137/15.21, 137/315.09, 625.21, 625.23; 91/375 A; 180/427, 180/441
See application file for complete search history.

(56) References Cited

U.S. PATENT DOCUMENTS

| 4,009,641 A | * | 3/1977 | Rohde et al. | ............... 91/375 A |
| 4,294,159 A | * | 10/1981 | Wendler et al. | ........... 91/375 A |
| 5,213,175 A | * | 5/1993 | Feindel | ........................ 180/428 |
| 6,415,885 B2 | * | 7/2002 | Sonoda | ...................... 91/375 A |

FOREIGN PATENT DOCUMENTS

| DE | 19921434 A1 | * | 11/2000 |
| EP | 903281 A1 | * | 3/1999 |
| JP | 04169376 A | * | 6/1992 |
| JP | 09002307 A | * | 1/1997 |
| JP | 09142321 A | * | 6/1997 |
| JP | 2000203438 A | * | 7/2000 |

* cited by examiner

*Primary Examiner*—John Rivell
(74) *Attorney, Agent, or Firm*—Jordan and Hamburg LLP

(57) ABSTRACT

A rotary slide valve, in particular for speed-dependent power steering systems in motor vehicles, has a torsion bar, a rotary slide, and a control bushing. The control bushing is pressed onto a pinion and the torsion bar is inserted into a torsion bar bore of the pinion. The control bushing is connected rotation-fast to the pinion by shaping. The torsion bar has teeth that are pressed into the torsion bar bore of the pinion and that connect the torsion bar to the pinion rotation-fast.

8 Claims, 1 Drawing Sheet

ROTARY SLIDE VALVE

BACKGROUND OF THE INVENTION

The invention relates to a rotary slide valve, in particular for speed-dependent power steering systems in motor vehicles.

The invention also relates to a method for assembling a rotary slide valve.

Rotary slide valves, for instance the Servotronic 2 valve from ZF Lenksysteme GmbH, are known from the general prior art. The general manner in which rotary slide valves function has also been known from the prior art for some time, in particular its use in vehicle power steering systems.

The known rotary slide valves have a torsion bar, a rotary slide, and a control bushing. In this, it is provided that the control bushing is pressed onto a pinion and the torsion bar is placed or pushed into a torsion bar bore of the pinion. A bore is added to the control bushing, torsion bar, and pinion, into which bore a pin is then inserted that joins the pinion rotation-fast to the torsion bar and the control bushing.

In this it is disadvantageous that, due to the boring, boring chips occur that can later cause problems. Moreover, adding the bore and the subsequent addition of a pin entails corresponding complexity in assembly and logistics.

SUMMARY OF THE INVENTION

The underlying object of the invention is therefore to create a rotary slide valve, in particular for speed-dependent power steering systems in motor vehicles, that is simple and cost effective to produce, that requires only a few components, and that satisfies stringent quality requirements.

The underlying object of the invention is also to create a method for assembling a rotary slide valve on a pinion.

The inventive solution makes it possible not to add a bore to the control bushing, the torsion bar, and the pinion and not to subsequently pin these components to one another. For one thing, it is possible to do without the boring process that has been necessary in the past and which was the reason for complexity associated with assembly and which could also cause problems due to the resultant boring chips. On the other hand, the time-consuming process of pinning the control bushing, the torsion bar, and the pinion to one another is no longer necessary. Consequently, due to the inventive solution the pin that was necessary in the past is no longer used, which reduces the number of components. The inventive rotation-fast connection between control bushing and pinion can be created simply, reliably, and rapidly using known shaping and forming techniques.

Shaping the control bushing for forming the rotation-fast connection to the pinion also assures that the control bushing can no longer be improperly removed from the pinion.

The design of the torsion bar with teeth that are pressed into the torsion bar bore of the pinion can be created simply and reliably with known pressing techniques. The inventive solution thus enables cost-effective and alternative production of a rotary slide valve or cost-effective assembly of the rotary slide valve on a pinion.

In the past, although the torsion bar was also inserted into a torsion bar bore of the pinion, this occurred in the form of simply pushing it into the torsion bar bore. The rotation-fast connection of the pinion to the torsion bar occurs by pinning the two components to one another. Teeth for the torsion bar in order to connect the latter to the pinion by pressing [it] into the torsion bar bore are not known from the prior art.

It is advantageous when the teeth of the torsion bar are embodied as serration. In experiments it was determined that this results in a particularly good connection between the torsion bar and the pinion. The serration then penetrates into the softer torsion bar bore of the pinion, so that the two parts are reliably connected to one another.

In accordance with the invention it can be provided that the pinion has a recess that runs at least around its exterior circumference, whereby the control bushing is shaped such that the shaped part of the control bushing is positioned against the recess such that a mechanism is formed that prevents the control bushing from being removed against the direction in which it is pressed in.

The shaped part of the control bushing can thus be hooked or caught with the recess such that it is no longer possible for the control bushing to move against the direction in which it is pressed in. It can be provided that the control bushing is pressed via the recess of the pinion, so that the part is correspondingly shaped or bent. The part can preferably be the front axial end of the control bushing that faces the pinion. The axial end of the control bushing can for instance be bent only at one or a plurality of areas on the circumference or even completely around the edge. What this attains is that the interior diameter of the control bushing in this area is smaller, overall or at least in one area, than the exterior diameter of the pinion over which the front axial end of the control bushing is pressed.

It is advantageous when the pinion has an elevation that runs at least partially around the exterior circumference of the pinion, whereby one side of the elevation that faces the pinion forms at least a part of the recess for positioning the shaped part of the control bushing.

In experiments it was found that a recess that is intended to prevent the control bushing from being removed after it has been shaped can be embodied in a simple manner in that the pinion has an elevation that preferably runs completely around its exterior circumference and the one side of which forms the recess. The interior diameter of the shaped part of the control bushing is smaller than the exterior diameter of the elevation, at least in one part, so that improper removal of the control bushing against the direction in which it is pressed in is prevented.

Furthermore in accordance with the invention, a stop or a shoulder can be provided that prevents improper movement of the pinion in the direction of the control bushing. The stop can be embodied in any desired type and manner, for instance as a locking ring that is provided to the pinion. However, the stop can also be embodied integral with the pinion. In particular when the rotary slide valve is used in a motor vehicle, axial forces act on the pinion and press the latter in the direction of the control bushing. The stop is intended to ensure that if the press connection between the pinion and the control bushing should fail due to extremely high axial forces of the pinion, the pinion nevertheless cannot move in the direction of the control bushing.

The object of the stop is thus to provide additional security.

It is advantageous when the stop is spaced slightly apart from the control bushing. This has been determined to be advantageous since then the positioning of the control bushing on the pinion is not defined by the stop but rather can be determined by a pre-specified and more precise amount of pressing in. Corresponding techniques are known from the prior art for precisely pressing the control bushing onto the pinion.

In accordance with the invention it can furthermore be provided that a seal is added between the control bushing and a valve housing for sealing the exterior of the control bushing in the direction of the pinion. It can be provided that a bearing is arranged between the control bushing and the valve housing in an end area facing the pinion, whereby the seal is adjacent to the side of the bearing facing away from the pinion and seals the latter.

In accordance with the solutions known from the prior art, the seal is arranged independent of the valve housing in a housing part that is adjacent to the valve housing and that largely surrounds the pinion. However, the inventors have determined that by integrating the seal into the valve housing, i.e. arranging the seal between the control bushing and the valve housing, a solution is created that is particularly impervious to soiling since the rotary slide valve thus forms a closed unit. Moreover, this reduces the assembly area.

Arranging the seal adjacent to the side of the bearing, for instance a ball bearing, that faces the valve interior has proved particularly suitable for creating a closed valve unit.

In a further development of the invention it can furthermore be provided that the pinion is inductively hardened. Conventional pinions as are used for rotary slide valves are case-hardened. The inventors have determined that an inductively hardened pinion can be used without qualitative disadvantages. Moreover, the inductively hardened pinion is simpler and more cost-effective to produce.

Advantageous embodiments and further developments of the invention result from the other subordinate claims.

One exemplary embodiment of the invention is depicted in principle in the following using the drawings.

DESCRIPTION OF THE PREFERRED EMBODIMENTS

The rotary slide valve depicted in the exemplary embodiment is particularly suitable for use in a speed-dependent power steering system for vehicles, especially motor vehicles. The manner in which speed-dependent power steering systems in motor vehicles function is known from the general prior art. Also common knowledge from the prior art is the manner in which rotary slide valves function, so that this will not be discussed in greater detail. Only the features that are essential for the invention shall be depicted in greater detail in the following.

Figure 1:
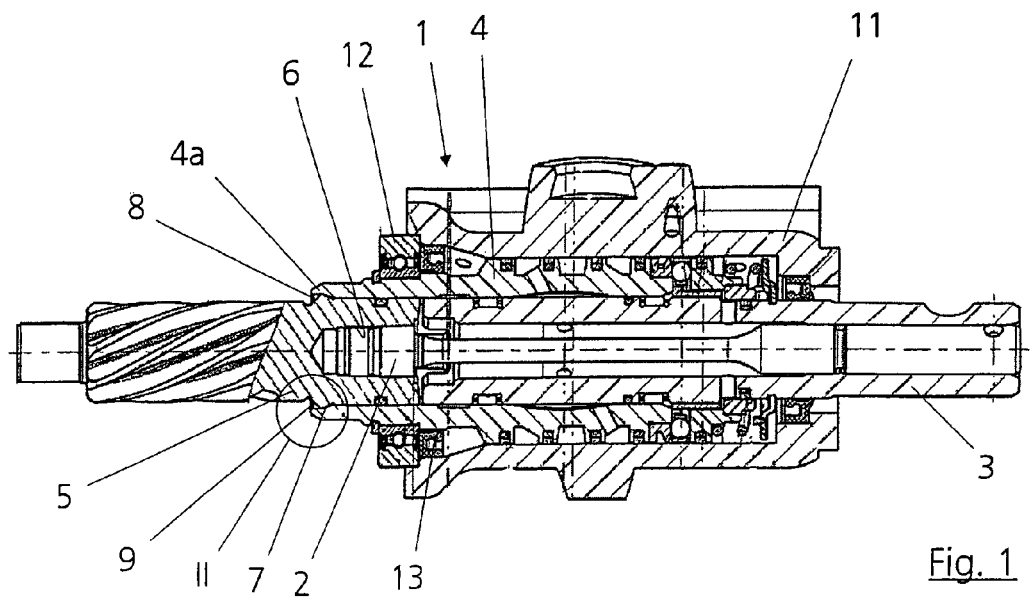
FIG. 1 is a section through a rotary slide valve that is connected to a pinion, the control bushing not yet being connected rotation-fast to the pinion by shaping.

As can be seen from FIG. 1, the inventive rotary slide valve 1 has a torsion bar 2, a rotary slide 3, and a control bushing 4. The control bushing 4 is pressed onto a pinion 5. The torsion bar 2 is inserted into a torsion bar bore 6 of the pinion 5. The control bushing 4 is connected rotation-fast to the pinion 5 by shaping a part 4a of the control bushing 4. In the exemplary embodiment, as can be seen in the detail in FIG. 2, it is provided that a front axial end 4a of the control bushing 4 that faces the pinion 5 is shaped. The axial front end 4a of the control bushing 4 can be caulked, for instance.

Figure 2:
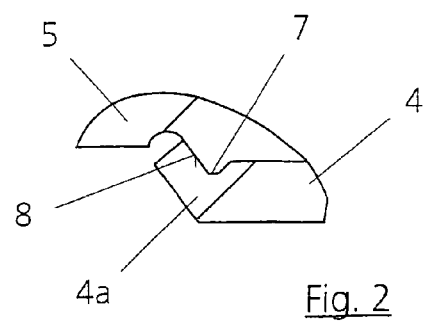
FIG. 2 is an enlarged view of the detail II in FIG. 1, illustrating the principle, in a depiction in which the control bushing is connected rotation-fast to the pinion by shaping.

As can furthermore be seen from FIG. 1 and FIG. 2, the pinion 5 has an elevation 7 that runs at least partly around the exterior circumference of the pinion 5, a side of the elevation 7 facing the pinion 5 being embodied as a recess 8 for positioning the shaped part 4a of the control bushing 4. In this manner a mechanism is embodied that prevents the control bushing 4 from being removed against the direction in which it is pressed in. The elevation 7 is embodied such that the control bushing 4 or at least the axial front end 4a of the control bushing 4 that is to be bent can be pressed over the elevation 7.

As can be seen from FIG. 1, the pinion 5 is provided with a stop 9 that prevents improper movement of the pinion 5 in the direction of the control bushing 4. In this, it is provided that the stop 9 is a slight distance from the control bushing 4 or from the front axial end 4a of the control bushing 4 (not shown in FIG. 1).

Figure 3:
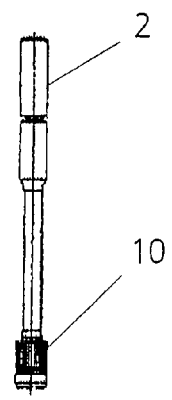
FIG. 3 is a torsion bar with teeth.

As can be seen in FIG. 3, the torsion bar 2 has teeth 10 that in the exemplary embodiment are embodied as serration. The torsion bar 2 is pressed with the teeth 10 into the torsion bar bore 6 of the pinion 5 such that the torsion bar 2 is connected rotation-fast to the pinion 5. The teeth 10 penetrate into the softer material of the pinion 5 and thus produce the rotation-fast connection.

A bearing 12, in the exemplary embodiment a ball bearing, is arranged in the usual manner between the control bushing 4 and a valve housing 11 in an end area facing the pinion 5. In accordance with the invention, in the exemplary embodiment it is provided that a seal 13 is added between the control bushing 4 and the valve housing 11 for exterior sealing of the control bushing 4 in the direction of the pinion 5, the seal 13 limiting and sealing the side of the bearing 12 facing away from the pinion 5. The seal 13 is embodied as a high-pressure seal.

In the exemplary embodiment it is provided that the pinion 5 is inductively hardened.

The inventive rotary slide valve 1 can be embodied as a six-groove valve or as a ten-groove valve. Naturally the invention is not limited to this, however; on the contrary the number of grooves has no further relevance to the invention.

In the following a particularly preferred method for assembling the rotary slide valve 1 shall be described.

In a first method step it is provided that the control bushing 4 is pressed onto the pinion 5 and is connected rotation-fast to the pinion 5 by shaping the axial front end 4a of the control bushing 4. In this, the control bushing 4 is pressed over the recess 8 or elevation 7 of the pinion 5 and shaped such that the shaped part 4a is mechanically linked to the recess 8 such that it is not possible to remove the control bushing 4 against the direction in which it is pressed in. Then the torsion bar 2 is pressed into the torsion bar bore 6 so that the pinion 5 is connected rotation-fast to the torsion bar 2. In the exemplary embodiment it is provided that the torsion bar bore 6 is embodied as a simple bore, i.e. it does not have any additional teeth. The control bushing 4 is pressed onto the pinion 5 with a pre-specified amount of pressure that can be precisely maintained using measures known from the prior art.

LEGEND

Rotary slide valve
Torsion bar
Torsion slide
Control bushing
Pinion
Torsion bar bore
Elevation
Recess
Stop Teeth
Valve housing
Ball bearing
Seal

The invention claimed is:

1. Rotary slide valve comprising, a torsion bar, a rotary slide, a control bushing, said control bushing being pressed onto a pinion and said torsion bar being inserted into a torsion bar bore of said pinion, said control bushing being connected rotation-fast to said pinion by shaping, said torsion bar having teeth that are pressed into said torsion bar bore of said pinion and connects said torsion bar to said pinion rotation-fast, said pinion having a recess that runs at least around its exterior circumference, whereby said control bushing is shaped such that the shaped part of said control bushing is positioned against said recess such that a mechanism is formed that prevents said control bushing from being removed against the direction in which it is pressed in.

2. Rotary slide valve in accordance with claim 1, wherein said pinion has an elevation that runs around the exterior circumference of said pinion, whereby one side of said elevation faces said pinion forms at least a part of said recess for positioning said shaped part of said control bushing.

3. Rotary slide valve in accordance with claim 2, wherein the end of said control bushing that faces said pinion can be pressed over said elevation.

4. Rotary slide valve in accordance with any of claims 2 or 3, comprising a stop that prevents improper movement of said pinion in the direction of said control bushing.

5. Rotary slide valve in accordance with claim 4, wherein said pinion is provided with said stop.

6. Rotary slide valve in accordance with claim 4 wherein said stop is spaced slightly apart from said control bushing.

7. Method for assembling a rotary slide valve on a pinion, according to which a control bushing is pressed onto a pinion and a torsion bar is inserted into a torsion bar bore of said pinion, said control bushing being connected rotation-fast to said pinion by shaping, said torsion bar being provided with teeth that are pressed into said torsion bar bore such that said pinion is connected rotation-fast to said torsion bar, said control bushing being pressed over a recess of said pinion, whereupon a part of said control bushing is shaped such that said shaped part is connected to said recess such that the control bushing is prevented from being removed against the direction in which it was pressed in.

8. Method in accordance with claim 7, wherein said pinion is inductively hardened.

* * * * *